June 26, 1962 L. L. CLAMPITT ETAL 3,041,497

MAGNETRON END SPACE DESIGNS

Filed Oct. 6, 1958 2 Sheets-Sheet 1

INVENTORS
LAWRENCE L. CLAMPITT
FRANK A. ZAWADA
BY H. Vincent Harsha
ATTORNEY

MAGNETRON END SPACE DESIGNS

Filed Oct. 6, 1958

INVENTORS
LAWRENCE L. CLAMPITT
FRANK A. ZAWADA
BY N. Vincent Harsha
ATTORNEY

United States Patent Office 3,041,497
Patented June 26, 1962

3,041,497

MAGNETRON END SPACE DESIGNS

Lawrence L. Clampitt, Wayland, and Frank A. Zawada, West Concord, Mass., assignors to Raytheon Company, a corporation of Delaware Filed Oct. 6, 1958, Ser. No. 765,390
6 Claims. (Cl. 315—39.77)

This invention relates generally to magnetrons and, more particularly, to magnetron end-space configurations for preventing the build-up of undesired modes of operation.

In magnetron operation it is usually desirable to operate in the predominant pi-mode of oscillation. As is well known, however, magnetrons are susceptible to operation in undesired competitive modes of oscillation, especially in pulsed type operation. One way to reduce the possibility that the magnetron will operate in a mode other than the pi-mode is to load the troublesome competitive modes, and especially that mode nearest the pi-mode, in some efficient and practical manner. Methods of loading competitive modes, other than the pi-mode, that have been used prior to this invention have limitations that may prove undesirable in some applications.

For example, output loading has often been used, in which the components of the undesired competitive mode are oriented with respect to the output such that these components are more or less equally coupled to and, thereby, loaded by the output circuit. While such a system may be workable in some fixed frequency magnetrons, it provides inadequate loading in some tunable magnetrons, because of the restrictions placed upon the frequency characteristics of the output circuit. Proper orientation of the components of the undesirable mode is difficult to achieve across the entire range of the tuning band. The introduction of tuning elements may tend to destroy the orientation of the mode components so that, at or near one or more regions of the tuning band, the loading of one of the components may become negligible and, hence, ineffective.

Another type of a loading that has been utilized makes use of the fringing fields which arise in the magnetron end spaces due to modes which are adjacent to the pi-mode. For instance, the most troublesome adjacent mode, which is the $$\left(\frac{N}{2}-1\right)$$

mode, has an inherently asymmetric energy distribution which produces a $TE_{11}$ mode component in the end space. Under certain conditions, this $TE_{11}$ mode is loaded by a coaxial line that is formed by the cathode and pole piece of the magnetron. The most important condition to be fulfilled is that the wave length of the mode that is to be propagated must be below the cutoff wave length of the coaxial line for this mode. In addition, the boundary conditions must be such that the coaxial line will be excited by the fringing fields. Because the cutoff wave length of the coaxial line is approximately the mean circumference of the inner and outer conductors, this mean circumference must be greater than the wave length of the competitive mode if loading is to occur. This means that the dimensions of the cathode and pole piece must be designed according to this restrictive specification in order to achieve effective loading. However, for other reasons not directly associated with the loading problem, the dimension of the cathode and pole pieces may have to be less than the required dimension for loading and, hence, the $TE_{11}$ coaxial mode cannot be effectively loaded.

This invention, which also makes use of the fringing field effects produced by the adjacent undesired modes, overcomes the dimensional disadvantages discussed above by providing an asymmetric end-space configuration that distorts the $TE_{11}$ component that is present in the end space. The distortion of the $TE_{11}$ component is such as to produce a TEM component, which mode, because it has no lower cutoff wave length, can be effectively loaded by the coaxial line made up of cathode support and pole piece regardless of the wave length or the dimensions involved. Thus, it is possible to load the components of the adjacent mode by loading the TEM mode that is excited due to the asymmetric end-space configuration without placing objectionable restrictions on the dimensions of the cathode and pole pieces. Furthermore, the symmetrical nature of the desired mode of operation limits the electric fields fringing into the end space and prevents unwanted coupling to this mode.

The operation of this invention can be best explained with the help of the drawing in which.

Figure 1:
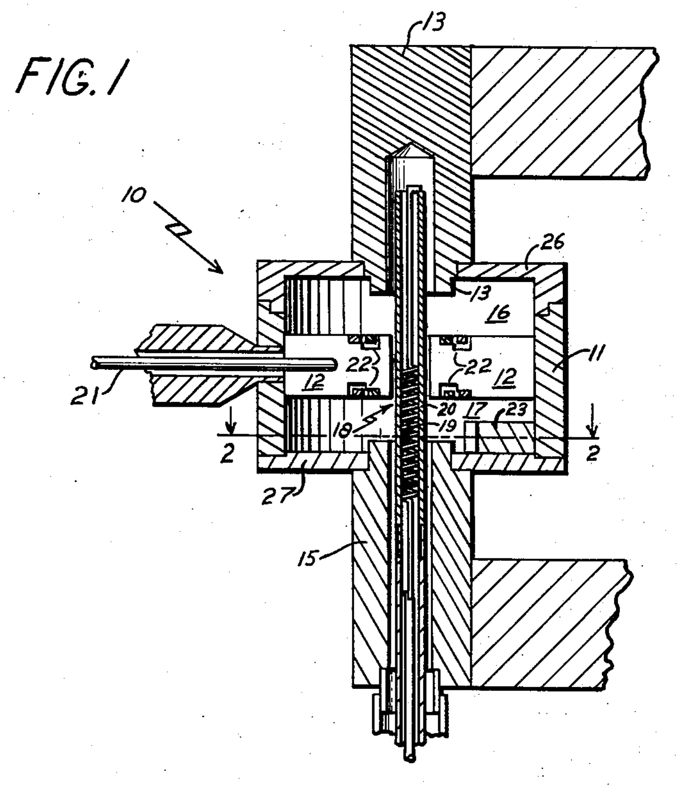
FIG. 1 shows a sectional view taken of a portion of a magnetron which utilizes a particular embodiment of the invention.

In FIG. 1 there is shown a magnetron structure 10 comprising an outer cylinder 11 which may be of any desired material, such as copper. Extending radially inward from cylinder 11 are a plurality of anode elements 12 which, in this embodiment, comprise substantially rectangular plates whose surfaces are parallel to the axis of cylinder 11. Pairs of straps 22 are connected at each end of anode elements 12 in a well-known manner. The invention is not necessarily restricted to end strapping as shown, but may also use center strapping wherein a pair of straps are connected through the center portions of anode elements 12. The upper end of cylinder 11 is sealed by end cover 26 and the lower end is sealed by end cover 27. Upper end space 16 and lower end space 17 are thereby formed above and below anode elements 12, respectively. Extending through an opening in upper end plate 26 and concentric with the axis of cylinder 11 is an upper magnetic pole piece 13, which may be of any suitable magnetic material. Pole piece 13 has a hole extending axially therein concentric with cylinder 11. Extending into this hole is a cathode structure 18 comprising a cylinder 20 which extends upwardly past anode elements 12 through end space 16 into the opening in pole piece 13. Cylinder 20 is coated with electron emissive material and contains therein a heater coil 19. Extending through a hole in lower end plate 27 is lower magnetic pole piece 15. Pole piece 15 has an opening extending axially therethrough concentric with cylinder 11. The lower end of cathode structure 20 extends downwardly through end space 17 into the opening in lower pole piece 15. Energy may be removed from the cavities formed by elements 12 in any well-known manner, for example, by means of a wire loop 21.

Figure 2:
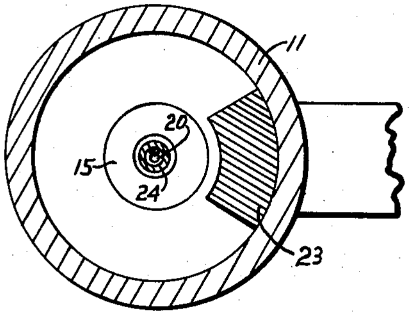
FIG. 2 shows a sectional view taken along the line 2—2 of the end-space configuration of the magnetron shown in FIG. 1.

A member 23, which may be made of any material but which is preferably made of a conductive and non-magnetic material, is mounted within lower end space 17, as, for example, on lower end plate 27. Member 23 thereby introduces an asymmetry in lower end space 17. As shown in FIG. 1 and FIG. 2, member 23 is shaped in the form of a cylindrical segment. In accordance with the invention, however, member 23 is not necessarily limited to any particular shape or size but may be of any desired shape or size to give suitable asymmetry for a particular tube that may be being used. As is shown in FIG. 2, cathode structure 18 and pole piece 15 are equivalent to a coaxial line in which cathode cylinder 20 acts as an inner conductor and pole piece 15 acts as the outer conductor with opening 24 therebetween.

In conventional magnetron operation, it is desirable to operate normally in the pi-mode of oscillation. However, because of the existence of a multiplicity of modes separated by a limited amount in frequency and voltage of operation, the magnetron may be capable of operating in other undesired modes. Usually the most troublesome mode in this respect is that mode which is nearest to the pi-mode. In the conventional anode vane type of structure, the most troublesome mode is the $$\left(\frac{N}{2}-1\right)$$

mode. In order to reduce the possibility that the magnetron will operate in this adjacent competitive mode, it is necessary to provide an adequate load for the $$\left(\frac{N}{2}-1\right)$$

mode. In this invention, the cathode structure 18 and pole piece 15 form a coaxial line which is utilized as a load on this undesired competitive mode. In conventional magnetrons in which the end spaces are substantially symmetric, the $$\left(\frac{N}{2}-1\right)$$

mode produces fields of the nature of a $TE_{11}$ mode of propagation in the end spaces. As explained above, restrictions placed on the dimensions of the cathode and pole piece structures may make the loading by the coaxial line ineffective with respect to this $TE_{11}$ mode. In this invention, however, member 23 provides an asymmetric and space configuration which allows the competitive undesired $$\left(\frac{N}{2}-1\right)$$

mode to be effectively loaded regardless of the wave length of the undesired mode that is involved. The reason why such an asymmetric configuration provides more effective loading may be best explained by considering analogously the effect of an asymmetry upon a more conventional coaxial line such as is shown in FIGS. 3–9.

Figure 3:
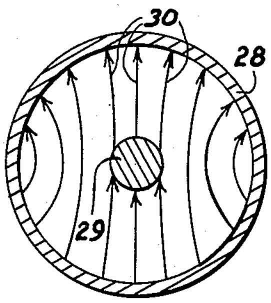
FIG. 3 shows a cross section of a symmetrical coaxial line and the electric fields corresponding to a $TE_{11}$ mode.
Figure 4:
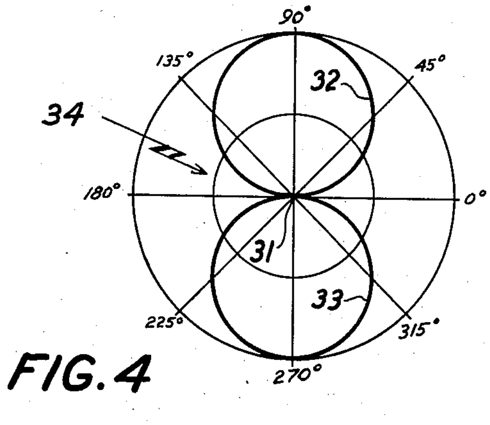
FIG. 4 shows a plot in polar coordinates of the strength of the electric fields present in the coaxial line of FIG. 3.

In FIG. 3, there is shown a cross-section view of a conventional coaxial line having an outer conductor 28 and an inner conductor 29. Arrows 30 indicate the electric field strength in the coaxial line. In FIG. 3, this field strength is due to a $TE_{11}$ mode of propagation. In FIG. 4, a graphical plot of the electric field strength is made by measuring the electric field in the coaxial line as a function of angle. Curve 34 of the electric field strength is plotted in polar coordinates and the origin 31 of the graph corresponds substantially to the center of the coaxial line. It can be seen in FIG. 4 that the field strength is substantially at a maximum at 90° and 270° and at a minimum at 0° and 180°. The plot, then, is in the form of a figure eight having an upper lobe 32 and lower lobe 33.

Figure 5:
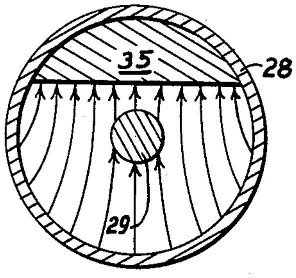
FIG. 5 shows a cross section of an asymmetric coaxial line and the electric fields resulting when coupled to a uniform coaxial line sustaining a $TE_{11}$ mode as in FIGURE 3.
Figures 6, 9:
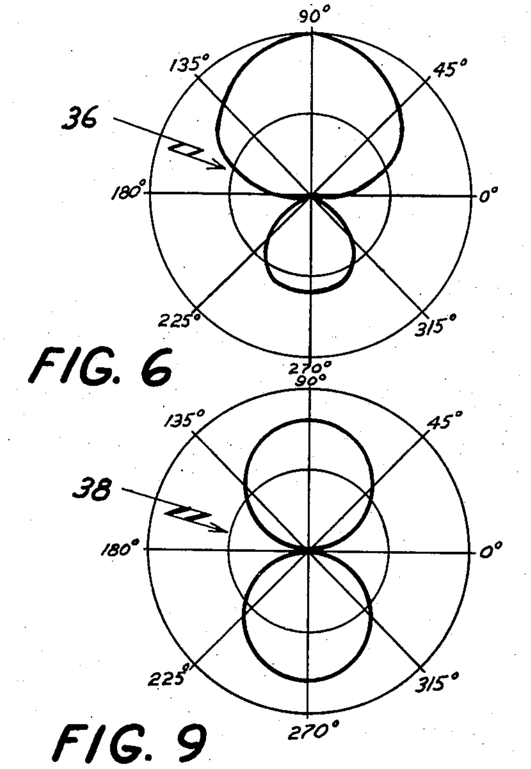
FIG. 6 shows a plot in polar coordinates of the strength of the electric fields present in the asymmetric coaxial line shown in FIG. 5.
FIG. 9 shows a plot in polar coordinates of the strength of the electric fields due to a $TE_{11}$ mode of propagation.

In FIG. 5, there is shown a coaxial line in which a member 35 is introduced to provide an asymmetry in the line. If measurements are made of the electric field in the coaxial line shown in FIG. 5, a graphical plot of the strength of the electric field can be drawn in polar coordinates as shown by curve 36 in FIG. 6. As seen in FIG. 6, the original figure eight field pattern of the symmetric coaxial line becomes greatly distorted. This distorted field pattern is due to the fact that the asymmetric member has altered the character of the electric fields so that substantially two components are present, one of which is due to a $TE_{11}$ mode of propagation and the other of which is due to a TEM mode of propagation.

The $TE_{11}$ and TEM components combine to produce the distorted electric field pattern curve 36 shown in FIG. 6. This combination can be understood more clearly if FIGS. 7–9 are examined.

Figure 8:
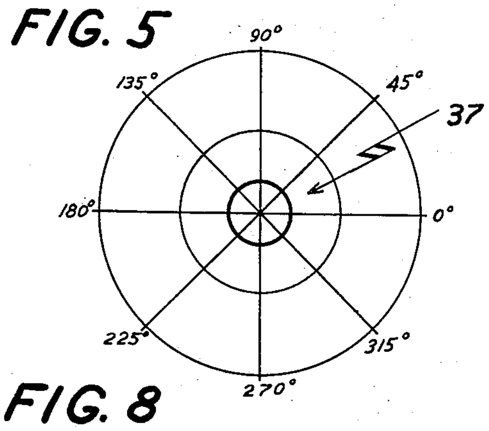
FIG. 8 shows a plot in polar coordinates of the strength of the electric fields due to a TEM mode of propagation.
Figure 7:
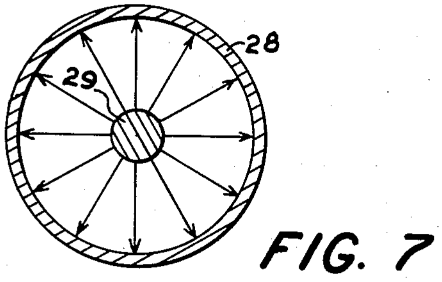
FIG. 7 shows a cross section of a coaxial line in which a TEM mode has been excited.

In FIG. 8, there is shown a plot in polar coordinates of the electric field strength that is produced in a coaxial line by a TEM wave having an electric field pattern, such as that shown in FIG. 7. Curve 37, shown in FIG. 8, represents a field strength having a constant amplitude radially in all directions as measured in the coaxial line. FIG. 9 shows a typical electric field pattern curve 38 for a $TE_{11}$ mode of propagation similar to curve 34 shown in FIG. 4. If curve 37 in FIG. 8 and curve 38 in FIG. 9 are combined, the resultant is the distorted field pattern curve 36 shown in FIG. 6. Thus, the original $TE_{11}$ wave shown in FIGS. 3 and 4 for a symmetrical coaxial line is converted to a wave having two components when an asymmetry is introduced into the line. A portion of the energy present is made up of a TEM electric field component represented by curve 37 in FIG. 8.

Cathode 18 and pole piece 15 of the magnetron shown in FIGS. 1 and 2 represent a coaxial line similar to those discussed with reference to FIGS. 3–9. Thus, when an asymmetry is introduced into the end space of a magnetron, the $TE_{11}$ component of the $$\left(\frac{N}{2}-1\right)$$

mode is distorted and a new wave having $TE_{11}$ and TEM components is generated. If a sufficient load is provided for the TEM component, it is possible to prevent undesired oscillations of the $$\left(\frac{N}{2}-1\right)$$

mode and, thus, to greatly enhance the probability that the magnetron will oscillate in the desired pi-mode. The loading of the TEM wave is not affected by the relationship between the wave length of the frequency involved and the mean circumference of the inner and outer conductors of the coaxial line made up of cathode structure 18 and pole piece 15.

The particular embodiment of the invention shown in FIGS. 1 and 2 does not necessarily represent the only possible embodiment of the invention. Other asymmetric configurations within the scope of this invention will occur to those skilled in the art in order to solve particular problems that may be at hand.

The asymmetric member may be constructed independently and mounted in the lower end space or in the upper end space or in both of the end spaces. The asymmetric member need not be constructed independently, but may be made up as a part of the original end plate. The size and shape of the asymmetry will depend on the problem involved and will, in most cases, require experiment in order to achieve the optimum loading for the problem at hand. Therefore, the invention is not to be construed to be limited to the particular embodiment described herein except as defined by the appended claims.

What is claimed is:

1. An electron discharge device adapted for operation in a predominant desired mode of oscillation and susceptible of operation in competitive undesired modes of oscillation, said device comprising, in combination, an anode structure, structural means for providing a pair of end spaces located above and below said anode structure, a pair of pole pieces having openings provided therein located adjacent said end spaces, a cathode adjacent said anode structure extending through said end spaces into said openings and substantially centrally positioned within said end spaces, means positioned in at least one of said end spaces for distorting the undesired modes of oscillation present in said end spaces, said cathode and one of said pole pieces thereby cooperating to form a coaxial load line for loading a substantial portion of the energy in said undesired modes of oscillation.

2. An electron discharge device adapted for operation in a predominant desired mode of oscillation and susceptible of operation in competitive undesired modes of oscillation, said device comprising, in combination, an anode structure, structural means for providing a pair of end spaces located above and below said anode structure, a pair of pole pieces having openings provided therein located adjacent said end spaces, a cathode adjacent said anode structure extending through said end spaces into said openings and substantially centrally positioned within said end spaces, means positioned in one of said end spaces for distorting the undesired modes of oscillation present in said end spaces, said cathode and one of said pole pieces thereby cooperating to form a coaxial load line for loading a substantial portion of the energy in said undesired modes of oscillation.

3. An electron discharge device adapted for operation in a predominant desired mode of oscillation and susceptible of operation in competitive undesired modes of oscillation, said device comprising, in combination, an anode structure, structural means for providing a pair of end spaces located above and below said anode structure, a pair of pole pieces having openings provided therein located adjacent said end spaces, a cathode adjacent said anode structure extending through said end spaces into said openings and substantially centrally positioned within said end spaces, means positioned in each of said end spaces for distorting the undesired modes of oscillation present in said end spaces, said cathode and one of said pole pieces thereby cooperating to form a coaxial load line for loading a substantial portion of the energy in said undesired modes of oscillation.

4. A magnetron adapted for operation in a desired pi-mode of oscillation and susceptible of operation in an undesired $$\left(\frac{N}{2}-1\right)$$

mode of oscillation, said magnetron comprising, in combination, an anode structure, structural means for providing a pair of end spaces located above and below said anode structure, a pair of pole pieces having openings provided therein located adjacent said end spaces, a cathode adjacent said anode structure extending through said end spaces into said openings and substantially centrally positioned within said end spaces, means positioned in at least one of said end spaces for distorting the undesired $$\left(\frac{N}{2}-1\right)$$

mode of oscillation in said end spaces, said cathode and one of said pole pieces thereby cooperating to form a coaxial load line for loading a substantial portion of the energy in said undesired modes of oscillation.

5. A magnetron adapted for operation in a predominant desired mode of oscillation and susceptible of operation in a competitive undesired mode of oscillation, said magnetron comprising, in combination, an anode structure, structural means for providing a pair of end spaces located above and below said anode structure, a pair of pole pieces having substantially cylindrical openings provided therein located adjacent said end spaces, a cathode adjacent said anode structure extending through said end spaces into said cylindrical openings and substantially centrally positioned within said end spaces, means positioned in at least one of said end spaces for distorting the undesired modes of oscillation present in said end spaces, said cathode and one of said pole pieces thereby cooperating to form a coaxial load line for loading a substantial portion of the energy in said undesired modes of oscillation.

6. A magnetron adapted for operation in a predominant desired mode of oscillation and susceptible of operation in a competitive undesired mode of oscillation, said magnetron comprising, in combination, an anode structure, structural means for providing a pair of end spaces located above and below said anode structure, a pair of pole pieces having substantially cylindrical openings provided therein located adjacent said end spaces, a cathode adjacent said anode structure extending through said end spaces into said cylindrical openings and substantially centrally positioned within said end spaces, means positioned in at least one of said end spaces for distorting the undesired modes of oscillation present in said end spaces, said cathode and one of said pole pieces thereby cooperating to form a coaxial line for presenting a resistive load to a substantial portion of the energy in said undesired modes of oscillation.

References Cited in the file of this patent

UNITED STATES PATENTS

| | | |
|---|---|---|
| 2,445,447 | Martin | July 20, 1948 |
| 2,547,848 | Barttro | Aug. 3, 1951 |

OTHER REFERENCES

Microwave Magnetrons, edited by George B. Collins, Massachusetts Institute of Technology, Radiation Laboratory Series, vol. 6, pages 498–508. Published by McGraw-Hill Book Co., Inc., New York, 1948 edition.